United States Patent [19]

Blake et al.

[11] Patent Number: 4,478,714

[45] Date of Patent: Oct. 23, 1984

[54] PRESSURIZED FILTRATION SYSTEM

[75] Inventors: Colin C. Blake, Rochford; Charles C. O. Goodall, Ilford; Paul A. Bacon, Hornchurch, all of England

[73] Assignee: Ciba-Geigy AG, Basel, Switzerland

[21] Appl. No.: 456,871

[22] Filed: Jan. 10, 1983

[51] Int. Cl.³ .............................................. B01D 29/10
[52] U.S. Cl. .................................. 210/136; 210/248; 210/340; 210/416.1; 137/625.48
[58] Field of Search ............ 210/167, 248, 340, 323.1, 210/416.1, 120, 90, 282, 123, 124, 136, 137; 137/625.48, 596.16, 596.12; 251/26

[56] References Cited

U.S. PATENT DOCUMENTS

| | | | |
|---|---|---|---|
| 2,434,427 | 1/1948 | Muller | 210/167 |
| 2,699,153 | 1/1955 | Russell | 137/625.48 |
| 2,979,160 | 4/1961 | Haas | 210/340 |
| 3,455,210 | 7/1969 | Allen | 137/117 |
| 3,533,434 | 10/1970 | Smith | 251/26 |
| 3,719,025 | 3/1973 | Heinze et al. | 55/58 |
| 3,935,108 | 1/1976 | Forgues | 210/340 |
| 3,979,292 | 9/1976 | Kuhn | 210/90 |
| 4,096,064 | 6/1978 | du Fresne | 210/120 |
| 4,373,698 | 2/1983 | Anisimov et al. | 251/26 |

FOREIGN PATENT DOCUMENTS

| | | |
|---|---|---|
| 2095426 | 11/1972 | France . |
| 556304 | 9/1943 | United Kingdom . |
| 1340726 | 12/1973 | United Kingdom . |
| 2014467 | 8/1979 | United Kingdom . |
| 2015891 | 9/1979 | United Kingdom . |

Primary Examiner—Richard V. Fisher
Assistant Examiner—Wanda L. Millard
Attorney, Agent, or Firm—Harry Falber

[57] ABSTRACT

There is described a pressurized filtration system for removing suspended solids from a liquid which comprises two enclosed filter vessels each containing either a removable filter bag or cartridge. The vessels are located in parallel in the circulation line of a pump which pumps the liquid from a bulk storage vessel through only one filter vessel at a time, this being controlled by a valve system in the circulation line to the filter vessels. Liquid forced through the filter vessel in use is pumped to a liquid storage vessel via a non-return valve located in the outlet line from each vessel, the outlet from each vessel having a branch connection to a shuttle valve, the outlet from which is connected via a non-return valve to the suction side of the pump, whereby when liquid is being pumped through one vessel the shuttle valve is shut against the flow of liquid therethrough but is open on the other side so that the liquid can be sucked out of the other vessel.

7 Claims, 1 Drawing Figure

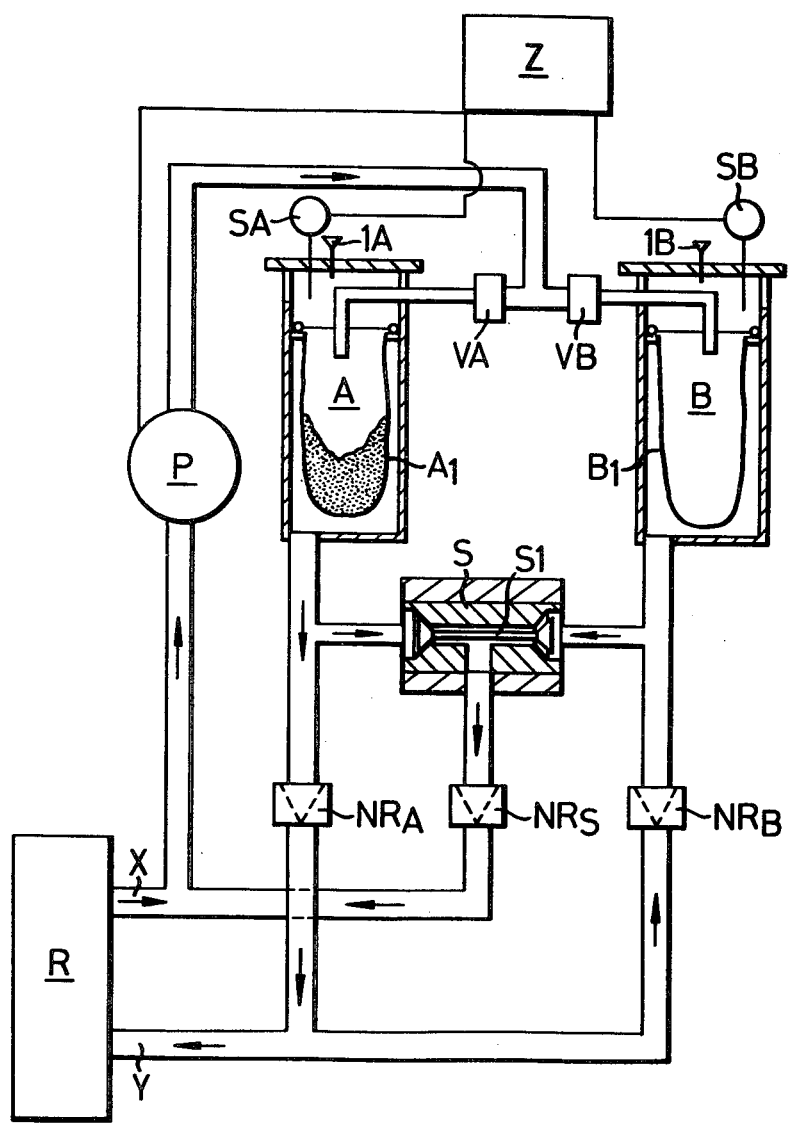

PRESSURIZED FILTRATION SYSTEM

This invention relates to a filtration system for removing suspended solids from a liquid.

In many instances it is required to remove suspended solids from a liquid and this is often done using a filtration system using a filter bag or cartridge in a filter vessel. When the filter bag or cartridge becomes full or choked with the filtered-out solid so that the filtration system no longer can operate it is required to stop the system and change the filter bag or cartridge. Often however it is inconvenient to have to stop the filtering and thus two filter vessels are sometimes mounted in parallel, one being used to accomplish the filtering whilst the other can be opened to change the bag or cartridge. However usually this is a messy business as it is difficult to drain liquid off the shut-off filter vessel, especially if, as is usual, the filtration system is a pressurized system.

Various filter systems have been described in which two filters are mounted in parallel. For example in the following patent specifications British patent specification Nos. 556,304, 1,340,726, 2,014,467 and 2,015,891, U.S. Pat. Nos. 2,434,427 and 3,979,292 and French patent specification No. 2,095,426 various types of filter systems are described which comprise two filters mounted in parallel. However in none of these is there employed a removable filter bag or cartridge. In most of the specifications a back-wash technique is employed to clean the filter not in service. Such back-wash techniques cannot be used when a removable filter or cartridge is employed in a filter system.

We have discovered a pressurized filtration system having two filter vessels in parallel wherein the filter vessel not being used can be drained of liquid before the full filter bag or cartridge is removed therefrom.

According to the present invention there is provided a pressurized filtration system for removing suspended solids from a liquid which comprises two enclosed filter vessels each containing either a removable filter bag or cartridge, the vessels being located in parallel in the circulation line of a pump which pumps the liquid from a bulk storage vessel through only one filter vessel at a time, this being controlled by a valve system in the circulation line to the filter vessels, liquid forced through the filter vessel in use being pumped to a liquid storage vessel via a non-return valve located in the outlet line from each vessel, the outlet from each vessel having a branch connection to a shuttle valve, the outlet from which is connected via a non-return valve to the suction of the pump, whereby when liquid is being pumped through one vessel the shuttle value is shut against the flow of liquid therethrough but is open on the other side so that liquid can be sucked out of the other vessel.

Preferably the valve system in the liquid circulation line to control the liquid entry to the filter vessel comprises an electrically controlled solenoid valve in the liquid entry line to each vessel. Alternatively a pneumatically operated valve may be present in the liquid entry line to each vessel.

Preferably a pressure sensitive switch is used to detect and indicate when a filter vessel is too full of solid to operate efficiently. Most preferably means are connected to the pressure sensitive switch to operate the valve system in the liquid circulation line to shut off one vessel and cause the liquid to be pumped through the other vessel.

In one embodiment means are provided to shut down the pump and so stop the liquid circulating if the bags or cartridges in both filter vessels are too full for the filter to operate; that is to say if the bag or cartridge in the vessel next in line has not been changed.

Preferably the non-return valves in the liquid exit lines from the two filter vessels and the shuttle valve are floating non-return valves.

Preferably each filter vessel has attached thereto a vacuum breaking non-return air valve. This is to prevent a large vacuum being created in a filter vessel when the liquid is being sucked therefrom.

The accompanying drawing will serve to illustrate the invention.

The FIGURE is a semi-sectional flow diagram of a filtration system according to the present invention.

In the FIGURE the filtration system is connected to a bulk liquid reservoir R containing suspended solids which are required to be removed therefrom by an inlet pipe X and an exit pipe Y.

The filtration system comprises two pressurized filter vessels A and B each containing a filter bags $A_1$ and $B_1$, a liquid circulating pump P which pumps the liquid from the storage tank R through the system as shown by the liquid flow arrows.

In the liquid entry lines to the vessels A and B are present two electrically controlled solenoid valves $V_A$ and $V_B$. Only one of these valves can be open at the same time.

Located at the top of each vessel A and B are two pressure sensitive switches SA and SB connected to an electronic control box Z. These switches respond to a change in pressure in the vessels A and B when the pressure reaches a predetermined amount one valve $V_A$ or $V_B$ will be shut and the other one opened. Also located at the top of each vessel are two non-return air valves $I_A$ and $I_B$. These valves act as vacuum breakers.

Located in the liquid flow circuit below the two vessels A and B is a shuttle valve S which contains a shuttle $S_1$.

Present in the liquid exit lines of vessels A and B and the liquid exit line of the shuttle valve S are three non-return float valves $NR_A$, $NR_B$ and $NR_S$.

In operation liquid contained in the reservoir and containing a dispersion of solid particles requiring filtration is drawn from the reservoir R via the inlet X by the pump P.

The liquid is then pumped through one or the other of the filter vessels A or B. The filter vessel used is selected by the relative states of the two valves $V_A$ and $V_B$. In the FIGURE $V_A$ is in the open position $V_B$ is closed.

Suspended solids are collected in the filter bag A. The filtered liquid is then forced out of the filter vessel A and returns to the reservoir R via the outlet Y.

At this stage the shuttle $S_1$ is pressurized on the left hand side providing a seal against liquid leaving filter A. Additionally the non return valve $NR_B$ prevents the pressurized liquid flowing into filter vessel B. There is however a free path from filter vessel B through the right hand side of the shuttle valve S back to the suction side of the pump P. Thus any liquid in filter vessel B is sucked out via this path.

When filter vessel A has collected a significant quantity of solid material and the pressure of liquid above the filter bag A has risen to a pre-selected level, this is sensed by the pressure switch $S_A$ which via the control electronics causes valve $V_A$ to close and valve $V_B$ to open.

It can be seen that the fluid flow described above is changed so that filter vessel B is now used for filtration of the liquid while the filter vessel A is automatically drained of liquid via the shuttle valve S and the pump.

The filter bag from A can be conveniently removed in a semi-dry state and a replacement filter introduced without interrupting the operation of the system.

Similarly when filter bag B is full the process is reversed.

When the filter vessels are in the position as shown in the FIGURE, that is to say liquid is being pumped through vessel A but the liquid has been drained out of vessel B a small amount of air will be sucked through vessel B and the shuttle valve S by the pump but by design of the flow system this can be reduced to a minimum. Further if required the shuttle S, can be made a 'sloppy' fit in the shuttle channel so allowing a small amount of liquid from vessel A to flow into and out of the shuttle valve.

The filtration system of the present invention is of particular use when it is required to recover the solid filtrate for further processing as it is recovered in a semi-dry compacted state.

What is claimed is:

1. A pressurized filtration system for removing suspended solids from a liquid which comprises two enclosed filter vessels each containing either a removable filter bag or cartridge, the vessels being located in parallel in the circulation line of a pump which pumps the liquid from a bulk storage vessel through only one filter vessel at a time, this being controlled by a valve system in the circulation line to the filter vessels, liquid forced through the filter vessel in use being pumped to a liquid storage vessel via a non-return valve located in the outlet line from each vessel, the outlet from each vessel having a branch connection to a shuttle valve, the outlet from which is connected via a non-return valve to the suction side of a pump whereby when liquid is being pumped through one vessel the shuttle valve is shut against the flow of liquid therethrough but is open on the other side so that liquid can be sucked out of the other vessel.

2. A pressurized filtration system according to claim 1 wherein the valve system in the liquid circulation line to control the liquid entry to the filter vessels comprises an electrically controlled solenoid valve in the liquid entry line to each vessel.

3. A pressurized filtration system according to claim 1 wherein a pressure sensitive switch is used to detect and indicate when a filter vessel is too full of solids to operate efficiently.

4. A pressurized filtration system according to claim 3 wherein means are connected to the pressure sensitive switch to operate the valve system in the liquid circulation line to shut off one vessel and cause the liquid to be pumped through the other vessel.

5. A pressurized filtration system according to claim 1 wherein means are provided to shut down the pump and so stop the liquid circulating if the bags or cartridges in both filter vessels are too full.

6. A pressurized filtration system according to claim 1 wherein the non-return valves in the liquid exit lines from the two filter vessels and the shuttle valve are floating non-return valves.

7. A pressurized filtration system according to claim 1 wherein each filter vessel has attached thereto a vacuum breaking non-return air valve.

* * * * *